US009840303B2

(12) United States Patent
Lutz et al.

(10) Patent No.: US 9,840,303 B2
(45) Date of Patent: Dec. 12, 2017

(54) FOLDING BICYCLE

(71) Applicant: FORD GLOBAL TECHNOLOGIES, LLC, Dearborn, MI (US)

(72) Inventors: Martin Lutz, Cologne (DE); Jan Linsel, Cologne (DE); Kay Hohenboeken, Cologne (DE); Stefan Quiring, Leverkusen (DE); Markus Reith, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/002,705

(22) Filed: Jan. 21, 2016

(65) Prior Publication Data

US 2016/0214676 A1  Jul. 28, 2016

(30) Foreign Application Priority Data

Jan. 22, 2015 (DE) .......................... 10 2015 200 994

(51) Int. Cl.
B62K 15/00 (2006.01)
(52) U.S. Cl.
CPC .................................. B62K 15/008 (2013.01)
(58) Field of Classification Search
CPC .... B62K 15/006; B62K 15/008; B62K 15/28; B62K 25/30; B62K 15/00
See application file for complete search history.

(56) References Cited

U.S. PATENT DOCUMENTS

| 6,942,235 B2 * | 9/2005 | Chang | B62K 15/00 280/278 |
| 6,979,013 B2 * | 12/2005 | Chen | B62K 15/008 280/278 |
| 7,156,409 B2 * | 1/2007 | Chuang | B62K 15/006 280/278 |

(Continued)

FOREIGN PATENT DOCUMENTS

| DE | 19702764 A1 | 8/1997 |
| EP | 0026800 A1 | 4/1981 |

(Continued)

OTHER PUBLICATIONS

Exam Report in corresponding international patent application No. DE 10 2015 200 994.7 dated May 31, 2017, 5 pages.

*Primary Examiner* — Kevin Hurley
(74) *Attorney, Agent, or Firm* — Frank MacKenzie; Brooks Kushman P.C.

(57) ABSTRACT

A folding bicycle has a main-frame with a bottom bracket, crank, pedals, and a seat post. A front is attached to the main-frame by a front hinge having an axis parallel to the crank axis, and has a mono-fork suspension. The front frame rotates about the front hinge to a folded position wherein the mono-fork is behind the front hinge axis. A rear swingarm suspension has a rear sprocket and is attached to the main-frame by a rear hinge that preferably is coincident with the crank axis. The swingarm is of a single-stay configuration and is rotatable about the rear hinge to a folded position wherein the rear sprocket is forward of the crank axis. The main-frame may consist of left and right sidewalls spaced apart from one another, and the mono-fork lies at least partially between the sidewalls when the front frame is in the folded position.

20 Claims, 5 Drawing Sheets

(56) References Cited

U.S. PATENT DOCUMENTS

| | | | | |
|---|---|---|---|---|
| 7,229,089 | B2* | 6/2007 | Mihelic | B62K 15/008 280/278 |
| 8,430,414 | B1* | 4/2013 | Yap | B62K 15/008 280/278 |
| 8,480,113 | B2* | 7/2013 | Moldestad | B62K 15/00 280/270 |
| 8,925,950 | B2* | 1/2015 | Falzari | B62K 15/006 280/278 |
| 9,290,229 | B2* | 3/2016 | Thompson | B62K 15/006 |
| 2009/0146391 | A1* | 6/2009 | Sutherland | B62K 19/08 280/287 |
| 2016/0114852 | A1* | 4/2016 | Baek | B62K 15/006 280/283 |

FOREIGN PATENT DOCUMENTS

| | | |
|---|---|---|
| JP | H08332984 A | 12/1996 |
| WO | 2011075454 A1 | 6/2011 |

\* cited by examiner

FOLDING BICYCLE

CROSS-REFERENCE TO RELATED APPLICATIONS

This application claims foreign priority benefits under 35 U.S.C. §119(a)-(d) to DE 10 2015 200 994.7 filed Jan. 22, 2015, which is hereby incorporated by reference in its entirety.

TECHNICAL FIELD

This disclosure relates to a bicycle that may be folded when not in use so that it may be easily carried and/or stored.

BACKGROUND

Various types of folding bicycle are known which comprise a rear swingarm which is advantageously spring-mounted to improve cycling comfort on uneven ground.

Folding bicycles may furthermore be distinguished by the nature of the frame between those which have a divided frame, the sub-frames whereof being connected via a folding hinge, and others in which the frame is integral. Integral (undivided) main-frames are regarded as highly rigid. Divided frames which have a folding hinge at the dividing point generally provide for a smaller overall package size in the folded state than integral frames.

Within the meaning of the invention, the divided frame is formed from two sub-frames, namely from the main-frame which is provided with a bottom bracket (bearing the crank and pedals) and seat post, and a front frame which substantially comprises the steering head subassembly (bearing the front suspension and wheel). Further frame components are provided to receive the wheels, namely wheel suspensions, specifically a front wheel suspension which is mounted in a steerable fashion by means of the steering head subassembly and also the rear swingarm which is hinged to the main-frame.

A generic folding bicycle is known from EP 0 026 800 A1. The known folding bicycle is subject to certain limitations in terms of cycling comfort, due to its necessarily small wheel diameter. The rear wheel may be limited in diameter so that is small enough for it to fit beneath the main tube of the main-frame in the folded state. For example, folding bicycles according to this prior art typically use wheels with a relatively small 16-inch diameter.

SUMMARY

The folding bicycle disclose herein has a hinge with a pivot axis arranged parallel to the axle of the bottom bracket, so that the front frame, including the steering head subassembly and the front wheel suspension, pivots beneath the main-frame. Further, the front wheel suspension is configured as a single-legged suspension (commonly referred to as a mono-fork) and/or the rear wheel suspension as a single-stay swingarm.

The mono-fork suspension at the front allows simple removal of the front wheel. Likewise, the rear single-stay swingarm allows the rear wheel to be detached very easily.

In the folded state, the forward frame (including the front wheel suspension) is arranged in a space-saving manner below the main-frame and not, as in the prior art, alongside the folded rear wheel. Since the rear wheel can also be swung beneath the main-frame by means of the single-stay swingarm, it is proposed that at least one of the wheels may optionally be removed. In this way, a particularly compact folding dimension is achieved. The wheels may be larger because they do not have to be folded as well. Hence, 20-inch diameter wheels can be provided for a folded frame, for example, and yet the packing dimension of these components of the folding bicycle still remains comparatively compact.

The single-stay swingarm is advantageously directed to one side of the folding bicycle and the mono-fork front suspension is directed to the opposite side, so that these two pivotable components cannot collide with one another in the folded state.

For simplicity, the hinge for folding the rear swingarm is designed in such a manner and that the hinge also forms the suspension bearing for the rear swingarm. The swingarm rear suspension permits swinging motion of the rear wheel which absorbs road shocks in cycling mode, as is well known in the art.

Furthermore, it is useful for there to be a quick-detachable front wheel axle on the mono-fork suspension and/or a quick-detachable rear wheel axle on the single-stay swingarm. If the front wheel axle or else the rear wheel axle is removed, the front mono-fork suspension or else the single-stay swingarm is of particularly narrow construction. This means it requires little space when it is pivoted beneath the main-frame. The main-frame is advantageously configured in such a manner that in the folded state the axle in question (front and/or rear) can be reattached to the appropriate suspension so that an unwanted swinging back and unfolding is prevented.

A steering column is preferably provided, wherein the steering column is arranged in a telescopic manner in the steering head-tube subassembly. In the folded state of the front frame, the steering column can be telescoped into the steering head subassembly in a shortened, space-saving manner. The steering column can therefore be telescoped between an extended/longer and retracted/shorter position. In addition the handlebar which is attached to the steering column can be removed therefrom and stored separately in a space-saving manner.

A receiving means for the handlebar may be provided, so that said handlebar can be arranged in a loss-proof manner in the folded state. To this end it is helpful for the main-frame to have a holding opening for the handlebar.

The main-frame and/or the front frame with the steering subassembly may be made at least in part of a composite material. The main-frame is advantageously composed of generally planar left and right sidewalls that and a center stay bridge which are made of composite material. The sidewalls are spaced part from one another and may be configured in such a manner that the rear single-stay swingarm and/or the front mono-fork suspension when pivoted to their respective folded positions fit at least partially between the sidewalls. A degree of protection from impact from outside is thereby provided.

A further benefit can be achieved if an electrical drive is provided as a pedaling aid and a sensor working together with the bottom bracket is provided, wherein the electrical drive can be actuated depending on the signal thereof.

The invention is illustrated by way of example in the drawing and described in detail below with the help of the drawing. In the figures:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
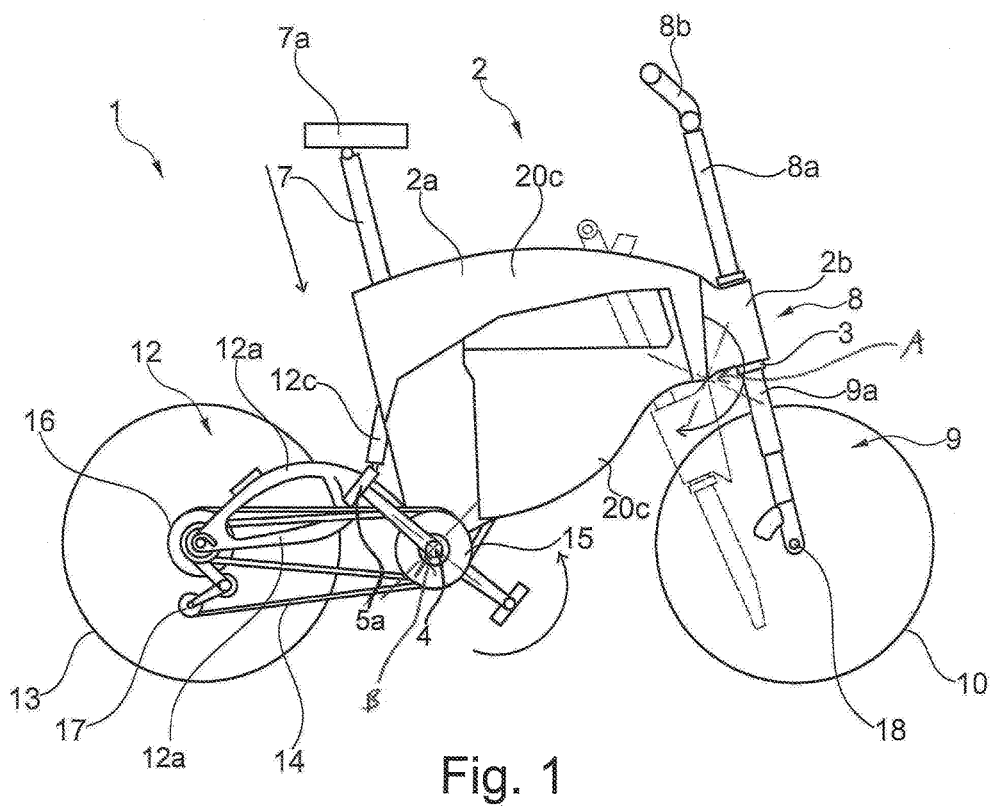
FIG. 1 shows a side view of the right side of a folding bicycle according to the present disclosure.

According to FIG. 1, a folding bicycle 1 is provided with a divided frame 2 which comprises a main-frame 2a and a front frame 2b connected by a folding hinge 3. Main-frame 2a comprises a generally conventional bottom bracket 4 mounting pedal cranks arms 5a, 5b and pedals 6a, 6b. A seat post 7 is removably and adjustably held by the main-frame 2a. The front frame 2b comprises a steering head 8 by which a front wheel suspension 9 and a front wheel 10 are mounted in a steerable manner.

A rear hinge 11 is provided, by means of which a swingarm-type rear suspension 12 is pivotably attached to the main-frame 2a. Rear suspension 12 comprises a swingarm 12a which may be further supported relative to the main-frame 2a by a suspension member 12c (for example, a combination spring/damper assembly). Rear suspension 12 further comprises a wheel 13 and conventional wheel driving means, such as a drive chain 14, a chainring 15, a rear sprocket 16 and derailleur/tensioning mechanism pulleys 17.

The front hinge 3 defines a hinge axis A that is oriented substantially parallel with the pedal crank axis. The rear hinge defines a hinge axis B that is oriented substantially parallel with (and is preferably coincident with) the pedal crank axis.

Figure 5:
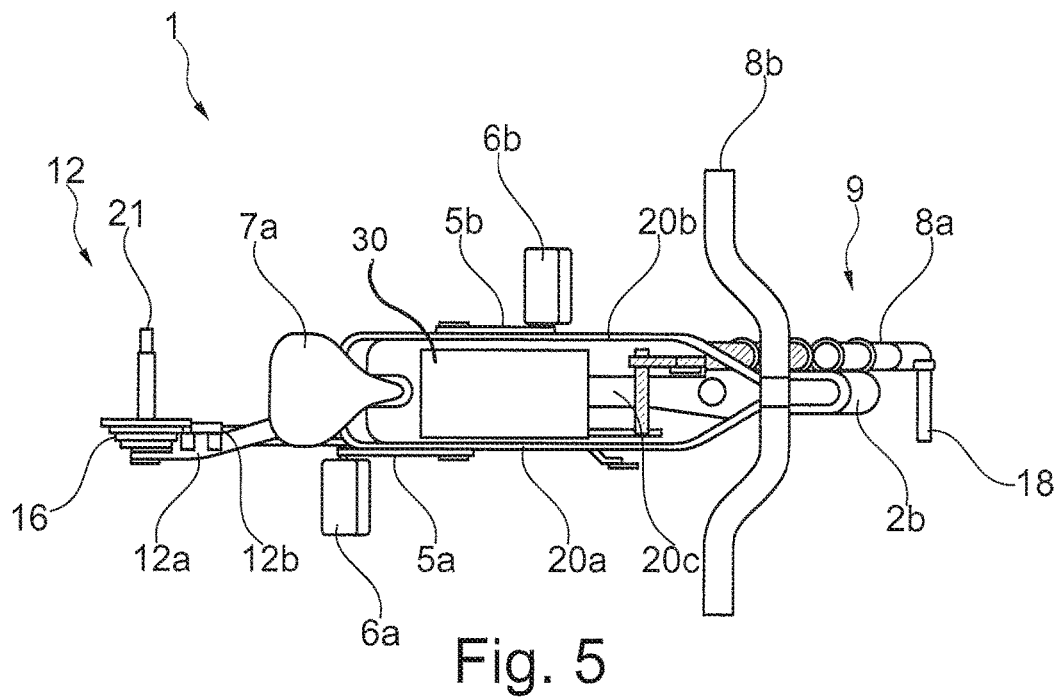
FIG. 5 shows a top or plan view of the folding bicycle of FIG. 1.
Figure 6:
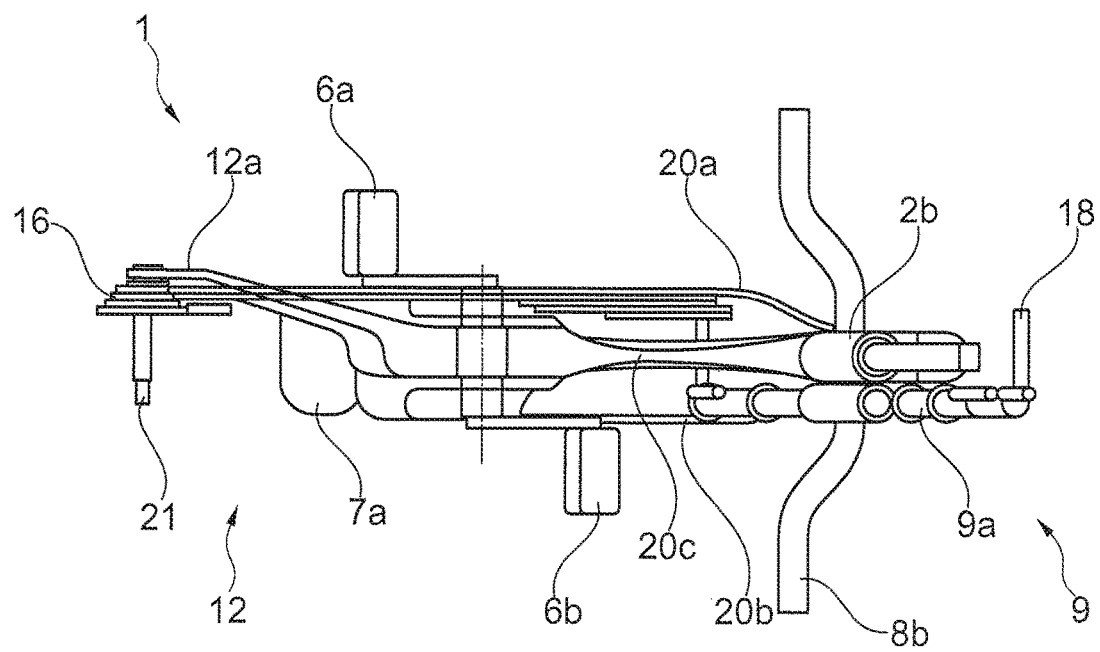
FIG. 6 shows a bottom view of the folding bicycle of FIG. 1.

In FIG. 1 the folding bicycle is depicted in the unfolded position ready for cycling. The rear swingarm 12a may advantageously be configured as a single-stay swingarm (of a general type known in the art) which extends on the right side (relative to the direction of travel) of the folding bicycle (best seen in FIGS. 5 and 6). The front wheel suspension 9a may advantageously be configured as a single- or mono-fork suspension and arranged on the left side (relative to the direction of travel) of the folding bicycle (as best seen in FIGS. 5 and 6). Mono-fork suspensions are known in the art, for example the mono-fork suspension known as "Lefty"® available from Cannondale.

The mono-fork suspension 9a is provided with a front wheel axle 18 to mount the front wheel 10 thereto. Advantageously, this front wheel axle 18 is mounted to the mono-fork 9a by means of a quick-disconnect mechanism so that it may be detached from the front suspension 9a without use of tools. Suitable quick-disconnect mechanisms may include a hand-detachable screw thread or a bayonet-type disconnect. The axle 18 can thereby be quickly and easily detached from the suspension 9 and re-fastened again.

The steering head subassembly 8 comprises a steering column 8a and a handlebar 8b. In FIG. 1 the position adopted by the front frame 2b when it is folded is indicated in dashed lines. In this folded position, the handlebar is preferably detached from the steering column 8a and the front frame 2b, including the front suspension 9, are pivoted through approximately 180°. The steering column 8a points downwards in the pivoted/folded position.

The front wheel axle 18 is advantageously detached from the front suspension 9 (by unscrewing it or releasing the quick-disconnect mechanism, for example), so that the front suspension 9 can be pivoted into the folded position shown in dashed lines. In this way, the front suspension 9 can be pivoted past the main-frame 2a without striking it with the front wheel axle 18. The front wheel axle 18 can then be re-attached to the front suspension 9 again. Because the front wheel axle prevents pivoting of the front suspension 9 back past the main-frame 2a again, the unit is secured the folded position.

The seat post 7 is received in the main-frame 2a in a removable manner. It can be inserted and extended and locked in any position/length to allow a user to set the desired seat height. Moreover, the seat post 7 can be inserted fully downward into the main-frame 2a, in order to minimize the packing dimension in the folded state. Alternatively, it is possible for the seat post 7 to be removed from the main-frame 2a and carried/stored separately.

The main-frame 2a in the exemplary embodiments described here is produced from a composite material. Bearing bushings are provided in this composite material, for receiving the bottom bracket 4, for example, and also for the swingarm hinge 11 which bears the rear suspension 12. Moreover, a receiving opening 19 for the seat post 7 is provided.

The main-frame 2a may comprise right and left sidewalls 20a, 20b spaced apart from one another and also a center stay bridge 20c. The sidewalls and the center stay bridge converge in the front frame region, where the front frame 2b is attached by means of the hinge 3. The sidewalls 20a, 20b and the center stay bridge 20c likewise converge in the rear frame region, where the seat post 7 and the bottom bracket 4 are located. Empty space is available between the sidewalls 20a, 20b, which empty space maybe usable to mount a battery 30 (shown only in FIG. 5) or as storage space.

The spaced-apart sidewalls 20a, 20b also provide space into which the front suspension 9 and/or the swingarm 12 can reside when in their respective folded positions. It may be seen that when the front frame 2b is folded downward and to the rear about axis A (as indicated in dashed lines In FIGS. 1 and 2), the front suspension 9 extends adjacent the left side of the center stay bridge 20c and between the sidewalls 20a, 20b of the main-frame 2a.

Figure 2:
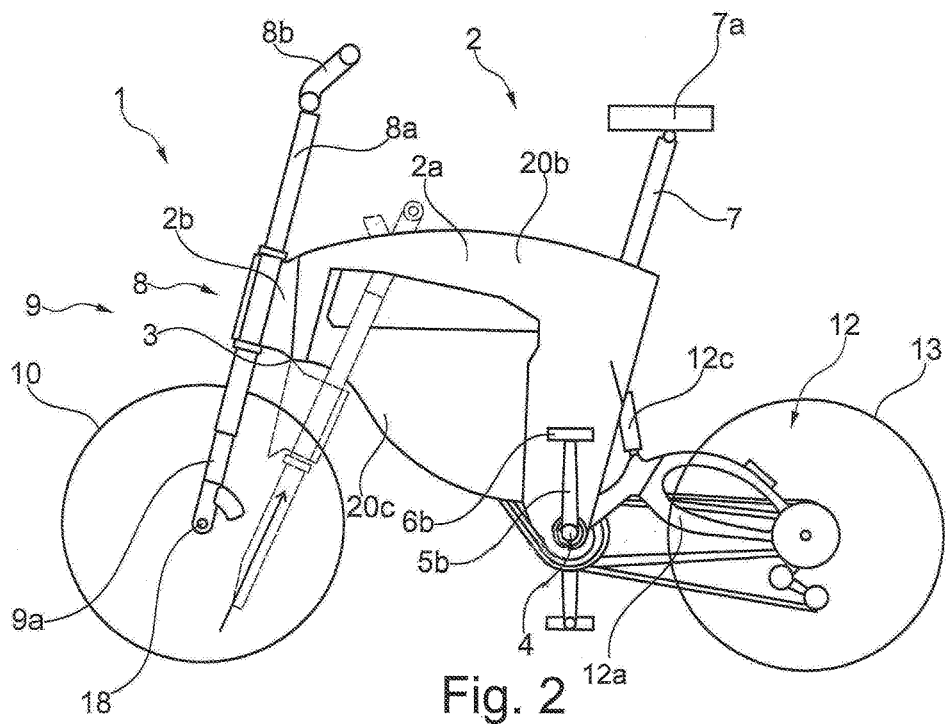
FIG. 2 shows a left side view of the folding bicycle of FIG. 1.
Figure 3:
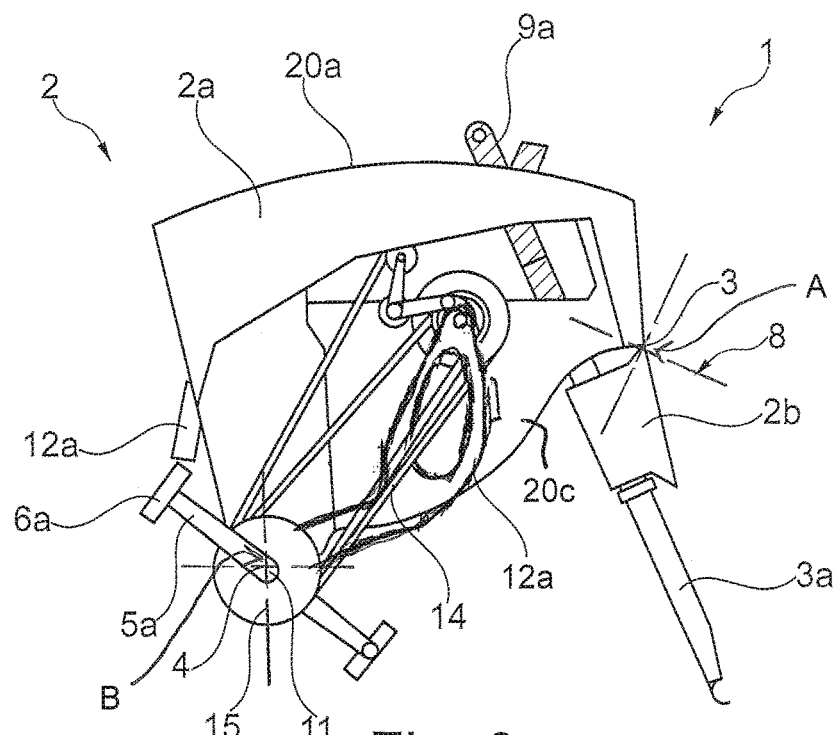
FIG. 3 shows a right side view of the folding bicycle of FIG. 1 in the folded state.
Figure 4:
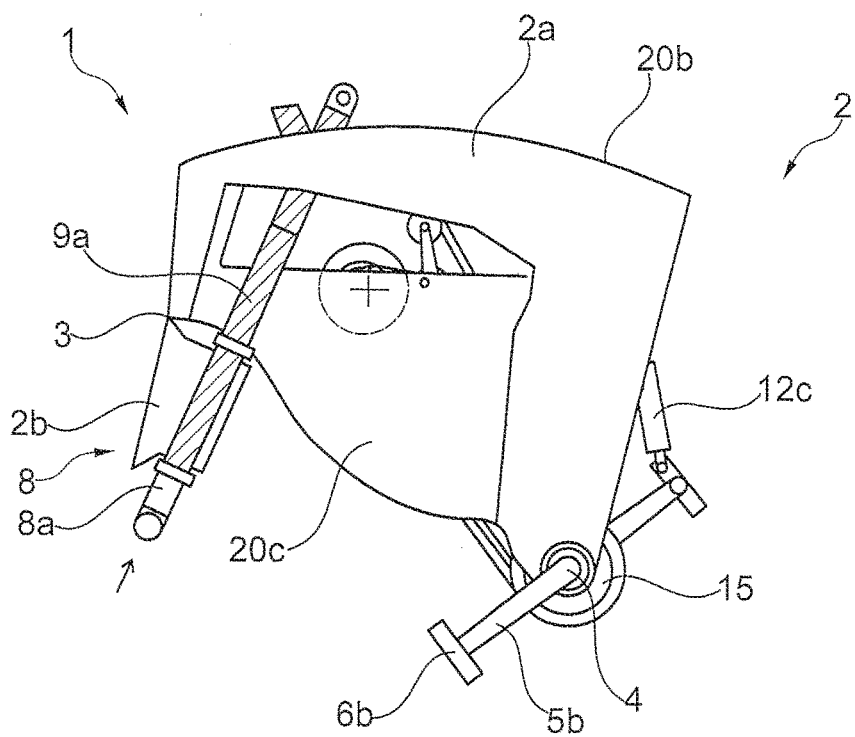
FIG. 4 shows a left side view of the folding bicycle of FIG. 2 in the folded state.

The folded position of the front frame 2b has been explained with the help of the dot-dash representation in FIGS. 1 and 2. FIGS. 3 and 4 also each depict the rear swingarm 12 in its folded position. The swingarm suspension element 12c is detached from the swingarm 12a (and/or from main-frame 2a) to permit the pivoting folding movement. Both the front wheel 10 and also the rear wheel 13 are not shown in the folded views, since they are removed from their respective front/rear suspensions prior to folding.

In order to be able to pivot the swingarm 12 about the hinge axis B into this position, a detachable rear wheel axle 21 is provided. Otherwise, it would collide on the pivoting path of the swingarm 12 with the center stay bridge 20c of the main-frame 20a. In the folded position of the swingarm 12 shown, the rear wheel axle 21 can be re-mounted to the swingarm and it then prevents the swingarm 12 from swinging back away from the folded position.

FIG. 5 shows a top (plan) view of the folding bicycle, wherein in this plan view both the front wheel 10 and the rear wheel 13 have been left out. The front wheel axle 18, the free end thereof projecting to the right side of the bicycle, and also the rear wheel axle 21, the free end thereof projecting to the left side of the bicycle, can clearly be seen. Moreover, the folded position of the front frame 2b is likewise depicted (in cross-hatch) with the front suspension 9 in FIG. 5. In this folded position, the front wheel axle 18 is re-attached to the front suspension 9 (after having been detached to permit the folding operation) and extends laterally above the center stay bridge 20c of the main-frame 2a.

The single-stay swingarm 9, when in the folded state (FIGS. 7-9), lies between the right sidewall 20b and the center stay bridge 20c. Moreover, a holding opening is provided in the center stay bridge 20c, which opening is intended to be used to receive the dismantled handlebar 8b when the folding bicycle is folded. The seat post 7 to which a saddle 7a is secured is held in the rear region of the main-frame 2a. Moreover, between the sidewalls 20a and 20b, a storage space 30 is provided which can be used for receiving a tool or also for receiving a battery, for example. A battery may be involved if the folding bicycle is to be fitted with an electrical drive which acts as an aid to pedaling.

FIG. 6 shows a view of the folding bicycle from below. As with the other folded views, the wheels 10 and 13 are removed. In turn, the front wheel axle 18 and also the rear wheel axle 21 can be identified, the free ends whereof project in opposite directions.

Figure 7:
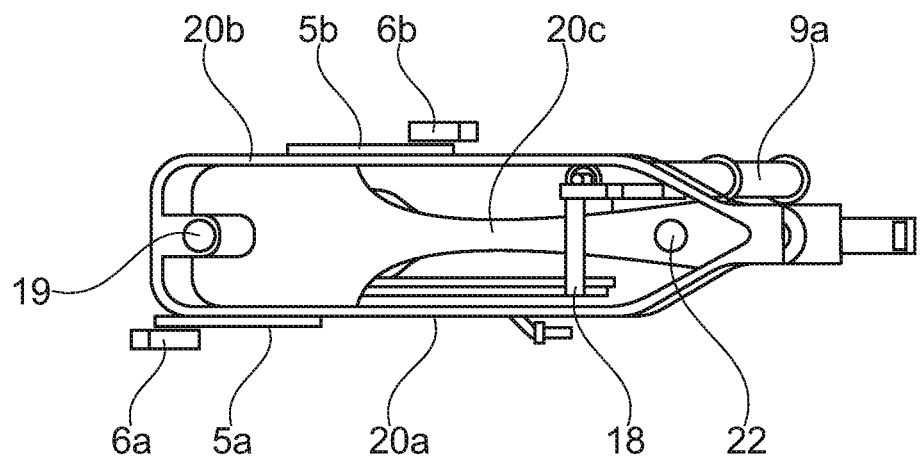
FIG. 7 shows a top view of the folding bicycle in the folded state.

FIG. 7 shows a plan view of the folding bicycle with the wheels 10 and 13 removed and in the folded state. According to this representation, the pedals 6a and 6b are also folded, so that they lie in respective generally vertical planes. In order to be able to fix the detached handlebar, a handlebar receiving opening 22 is provided in the center stay bridge 20c of the main-frame 2a. In the folded state, a very compact package is produced overall which can be stowed in a very space-saving manner. It is possible, for example, if the folding bicycle is to be transported in a motor vehicle, for the detached wheels 10 and 13 to be housed in a spare wheel well of the motor vehicle and for only the compact main-frame with the folded wheel suspensions 9 and 12 to be stowed in the boot, where it only takes up a small amount of space.

Figure 8:
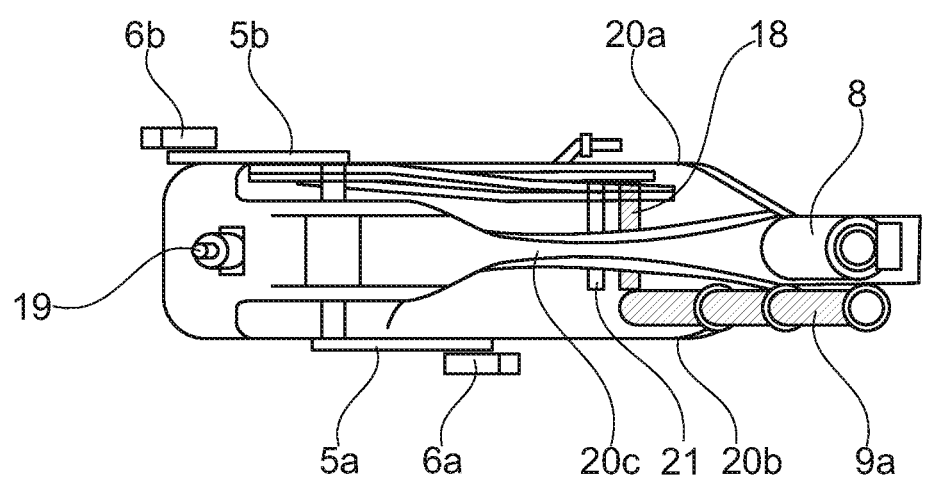
FIG. 8 shows a bottom view of the folding bicycle in the folded state.

A view of the folded state from below is depicted in FIG. 8. The underside of the center stay bridge 20c can clearly be seen and behind this, the front wheel axle 18 of the front suspension 9a can be seen partially concealed.

Figure 9:
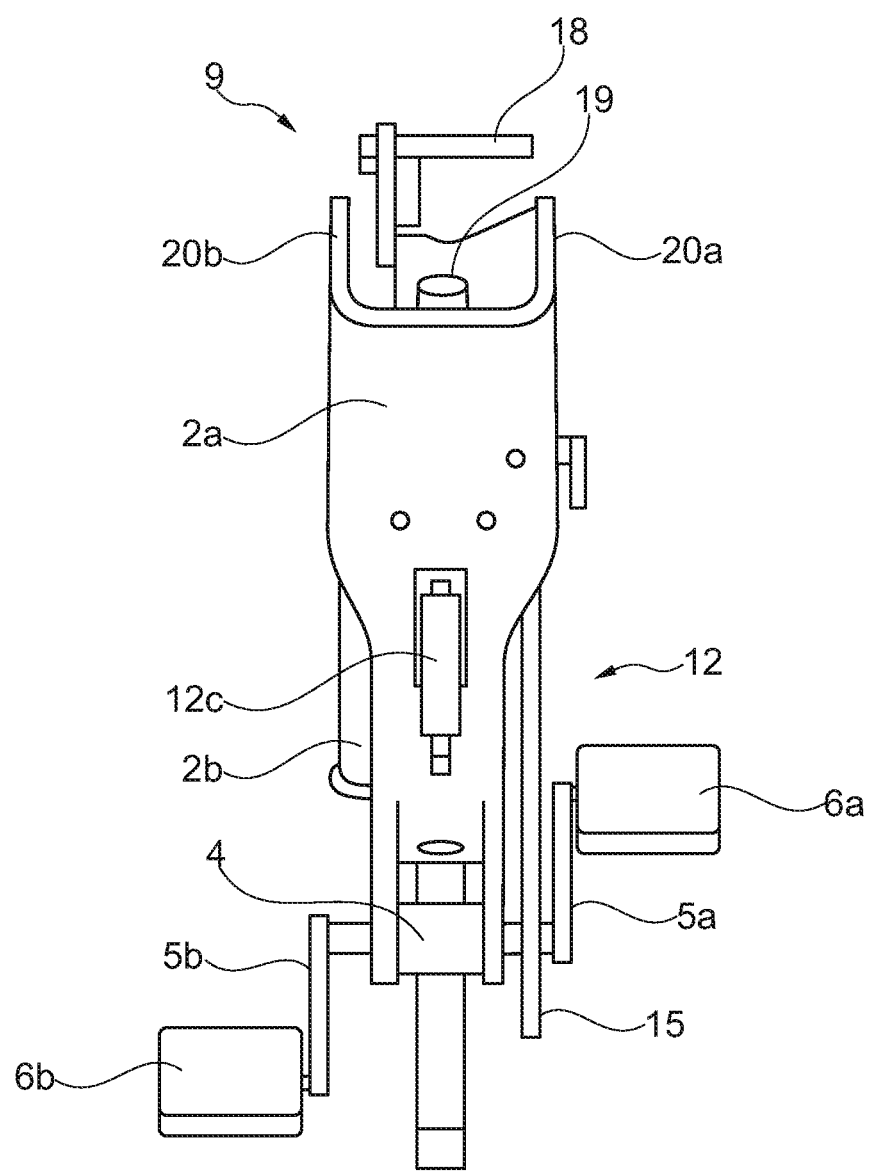
FIG. 9 shows a rear view of the folding bicycle in the folded state.

FIG. 9 is a view from behind of the main-frame 2 in the folded state. The suspension element 12c is shown attached to the rear side of the main-frame 2a, but detached from the rear suspension 12 for folding of the swingarm. Furthermore, the front frame 2b is folded in FIG. 9, which can best be seen through the front wheel axle 18 projecting on the right side. The sidewalls 20a, 20b of the main-frame and also the receiving opening 19 for the seat post 7 provided in the main-frame can also be seen.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bicycle comprising:
a main-frame having a crank axis;
a swingarm attached to the main-frame by a rear hinge having an axis parallel and coincident with the crank axis and rotatable thereabout to be forward of the crank axis; and
a front frame attached to the main-frame by a front hinge having an axis parallel with the crank axis and rotatable thereabout such that a wheel axle is behind the front hinge axis.

2. The bicycle of claim 1, wherein the front frame comprises a mono-fork.

3. The bicycle of claim 2, wherein the mono-fork comprises a quick-detach wheel axle.

4. The bicycle of claim 1, wherein swingarm is of a single-stay configuration.

5. The bicycle of claim 4, wherein the swingarm comprises a quick-detach wheel axle.

6. The bicycle of claim 1, wherein the front frame comprises a steering head subassembly which telescopingly receives a steering column.

7. The bicycle of claim 1, wherein the main-frame comprises a left sidewall and a right sidewall spaced apart from one another, and at least a portion of the front frame is positioned between the sidewalls when the wheel axis is behind the front hinge axis.

8. The bicycle of claim 1, wherein the main-frame is made at least in part of a composite material.

9. A bicycle comprising:
a main-frame having a crank axis;
a swingarm attached to the main-frame by a rear hinge having an axis parallel with the crank axis and rotatable thereabout to be forward of the crank axis; and
a front frame attached to the main-frame by a front hinge having an axis parallel with the crank axis and rotatable thereabout such that a wheel axle is behind the front hinge axis, wherein the front frame comprises a mono-fork.

10. The bicycle of claim 9, wherein the mono-fork comprises a quick-detach wheel axle.

11. The bicycle of claim 9, wherein the swingarm is of a single-stay configuration.

12. The bicycle of claim 9, wherein the swingarm comprises a quick-detach wheel axle.

13. The bicycle of claim 9, wherein the front frame comprises a steering head subassembly which telescopingly receives a steering column.

14. The bicycle of claim 9, wherein the main-frame comprises a left sidewall and a right sidewall spaced apart from one another, and at least a portion of the front frame is positioned between the sidewalls when the wheel axis is behind the front hinge axis.

15. The bicycle of claim 9, wherein the main-frame is made at least in part of a composite material.

16. A bicycle comprising:
a main-frame having a crank axis;
a swingarm attached to the main-frame by a rear hinge having an axis parallel with the crank axis and rotatable thereabout to be forward of the crank axis; and
a front frame attached to the main-frame by a front hinge having an axis parallel with the crank axis and rotatable thereabout such that a wheel axle is behind the front hinge axis, wherein the main-frame comprises a left sidewall and a right sidewall spaced apart from one another, and at least a portion of the front frame is positioned between the sidewalls when the wheel axis is behind the front hinge axis.

17. The bicycle of claim 16, wherein the front frame comprises a mono-fork.

18. The bicycle of claim 17, wherein the mono-fork comprises a quick-detach wheel axle.

19. The bicycle of claim 16, wherein the swingarm is of a single-stay configuration.

20. The bicycle of claim 16, wherein the swingarm comprises a quick-detach wheel axle.

* * * * *